Figure 1:
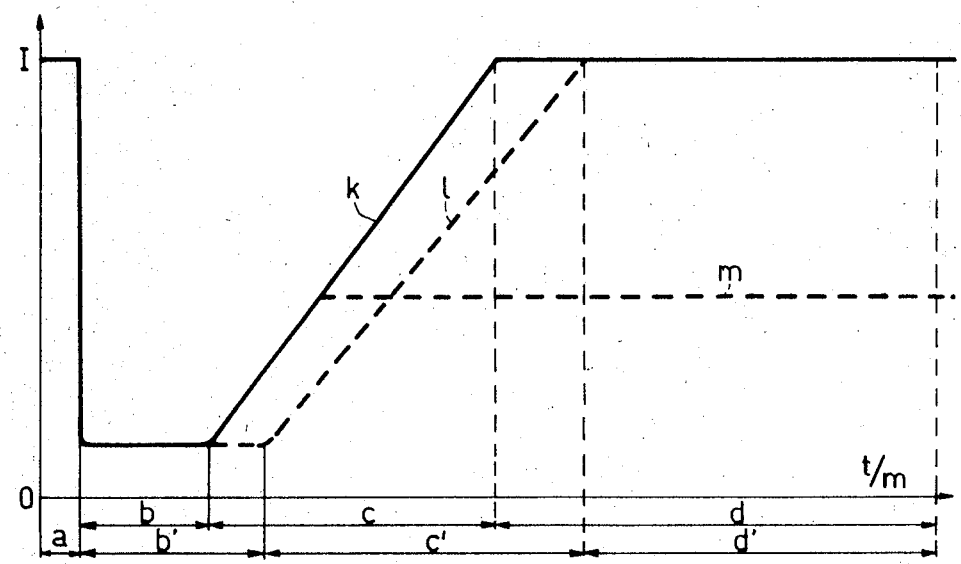

United States Patent

[11] 3,581,156

| [72] | Inventors | Raymond Dolbachian<br>Meudon;<br>Claude Lefevre, Saint Maur, both of, France |
|---|---|---|
| [21] | Appl. No. | 797,115 |
| [22] | Filed | Feb. 6, 1969 |
| [45] | Patented | May 25, 1971 |
| [73] | Assignee | U.S. Philips Corporation<br>New York, N.Y. |
| [32] | Priority | Feb. 16, 1968 |
| [33] | | France |
| [31] | | 140113 |

[54] ELECTRONIC ARRANGEMENT FOR CONTROLLING AN ELECTROMAGNETIC CLUTCH
10 Claims, 5 Drawing Figs.

[52] U.S. Cl. .................................. 317/123, 317/148.5, 192/103, 192/3.5
[51] Int. Cl. .................................................. F16d 67/00, H01h 47/32

[50] Field of Search.................................... 317/123 (CD), 148.5; 192/3.5 (E), 103, 103 (A)

[56] References Cited
UNITED STATES PATENTS

| 3,203,518 | 8/1965 | Deras | 192/3.5E |
| 3,402,793 | 9/1968 | Scholl | 192/3.5E |

*Primary Examiner*—Lee T. Hix
*Attorney*—Frank R. Trifari

ABSTRACT: An automatic clutch control system for use in a motor vehicle includes an engine speed transducer that supplies a speed voltage to a control circuit. A power circuit controlled by the control circuit supplies current to the operating coil of the automatic clutch. The control circuit produces control voltages at distinct operating threshold levels for the power circuit that correspond to four engine operating zones, i.e. engine standstill, idling, transmission gear drive, and high speed drive.

ELECTRONIC ARRANGEMENT FOR CONTROLLING AN ELECTROMAGNETIC CLUTCH

The present invention concerns an automatic clutch control system and, more particularly, to an automatic clutch control system for use in motor vehicles.

As in known, the present tendency in motor vehicle engineering is to provide partial or entire automation of the controls of the mechanical transmission between the engine and the driving wheels.

Thus, with respect to the clutch, electromagnetic control thereof has made possible arrangements which relieve the operator from the necessity of using the clutch for gear shifting. The clutch control coil generally is energized by means of an auxiliary brush on the direct-current dynamo, the brush supplying a voltage which increases with an increase in the engine speed. This feeding method must be used in conjunction with associated circuits in order to satisfy certain requirements that follow from the conditions of use of the vehicle.

The gradual replacement of the dynamos by alternating-current generators has resulted in a search for other solutions, among which may be mentioned controlling the current in the clutch coil by means of a voltage which depends on the engine speed and which is supplied by an electric, magnetic or electro-optic transducer.

The simplest solution consists in employing the voltage obtained by integrating the ignition pulses, the frequency of which is directly proportional to the engine speed. Unfortunately, this arrangement cannot be used in diesel engines and, for these engines, the most economical solution is to arrange a magnetic transducer near the toothed ring of the flywheel of the engine, used for starting. The output signal of this transducer consists of a pulse train having a repetition frequency which is proportional to the engine speed.

The arrangement which supplies the current to the clutch coil must have an output characteristic (current strength as a function of engine speed) which comprises at least a first zone in which the current is zero, a second zone in which it gradually increases and a third zone in which it is constant. A direct-acting control device would give rise to inadmissible jerks in the transmission, but the zone of gradual increase enables the clutch to slip, which slipping is facilitated in magnetic powder clutch systems.

It is of advantage to provide also an output characteristic in which the clutch is fully engaged at zero speed, i.e. with the engine stationary. Otherwise it would be impossible, in the case of a starter failure, to start the engine by pushing the vehicle or by causing it to run down a slope.

Finally, the arrangement must enable the current in the clutch coil to be cut off during operation of the gear lever and to be limited in the zero position of the accelerator pedal, to allow the clutch to slip during gear changes.

In the special case of the clutch being of the magnetic powder type, the cutting off of the current by the gear lever must be followed by the flowing of a weak demagnetizing reverse current, in order to avoid the pinions of the gearbox being undesirably driven by remanent magnetism, during a gear change.

Several transistorized electronic arrangements which fulfill the aforementioned various functions have already been developed but they generally require a large number of component parts and their efficiency is poor. Considering the conditions under which they have to operate, this is a serious drawback owing to the resulting heat production.

It is an object of the present invention to provide an electronic arrangement for controlling an electromagnetic clutch and which comprises an engine speed transducer, a control circuit controlled by a voltage supplied by said transducer and increasing with increasing engine speed and a power circuit for supplying energy to an operating coil of the clutch. It enables to construct an arrangement which is simple and at the same time has a high efficiency.

According to the invention, the said arrangement is characterized in that the control circuit has a first operating threshold below which it controls the said power circuit in a manner such that the latter circuit supplies maximum energy to the working coil and above which it controls the said power circuit in a manner such that it supplies minimum energy to the working coil, a second operating threshold above which it controls the power circuit in a manner such that it supplies to the working coil a quantity of energy increasing with increasing engine speed, and in that the arrangement has a third operating threshold above which the power circuit supplies maximum energy to the working coil.

Figure 3:
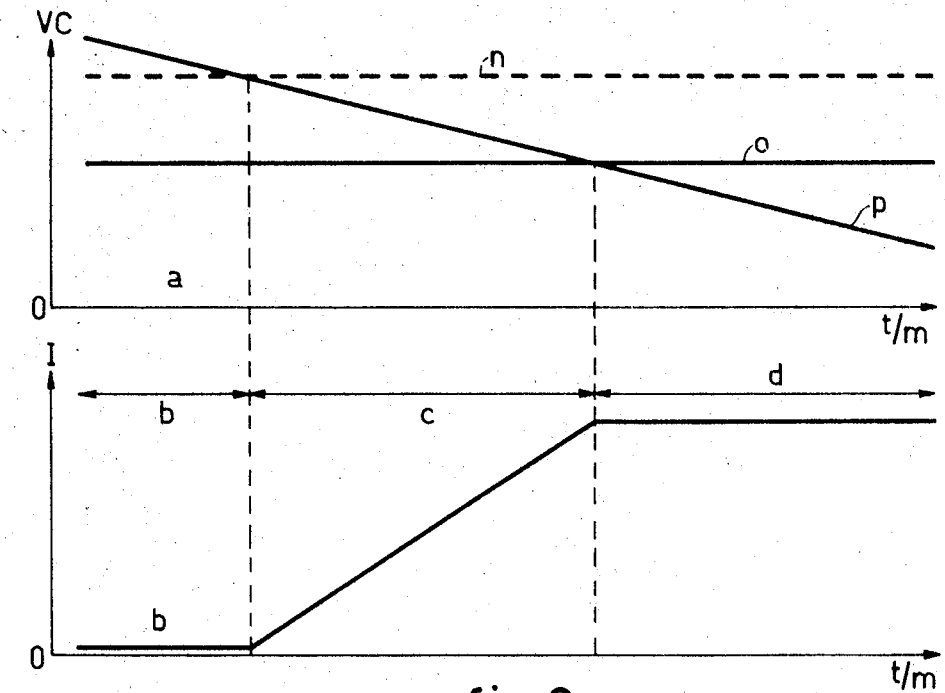
Figure 2:
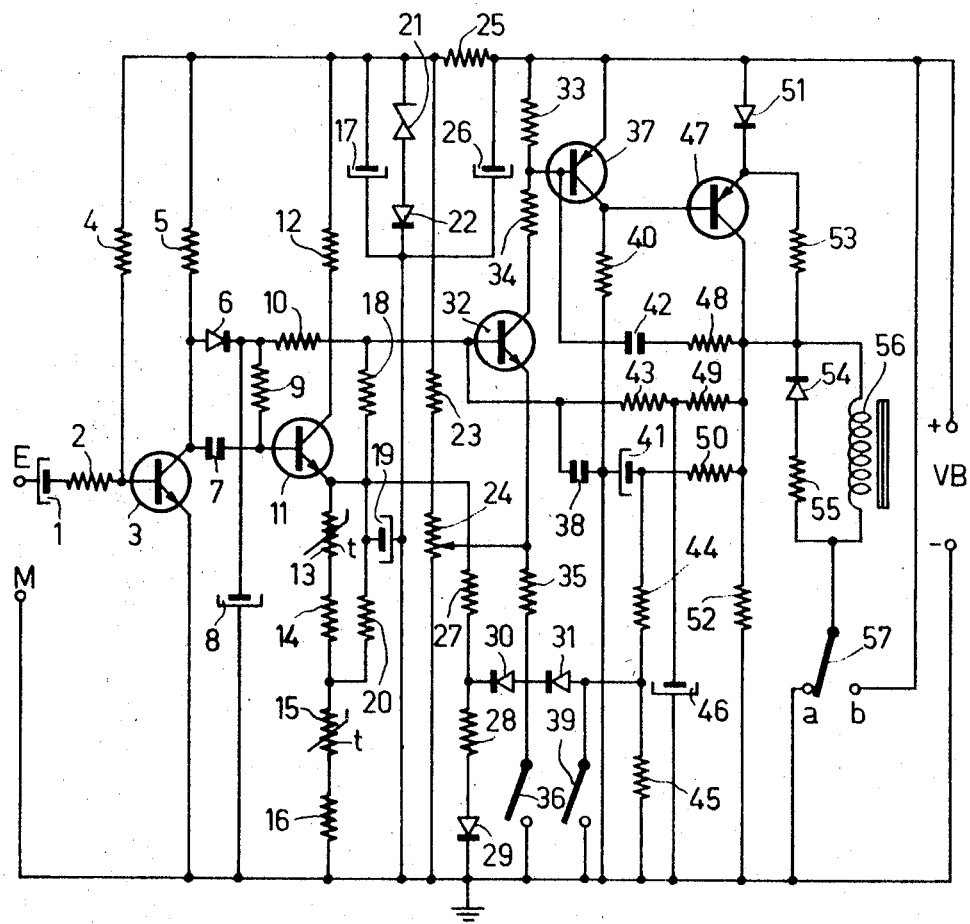
Figure 4:
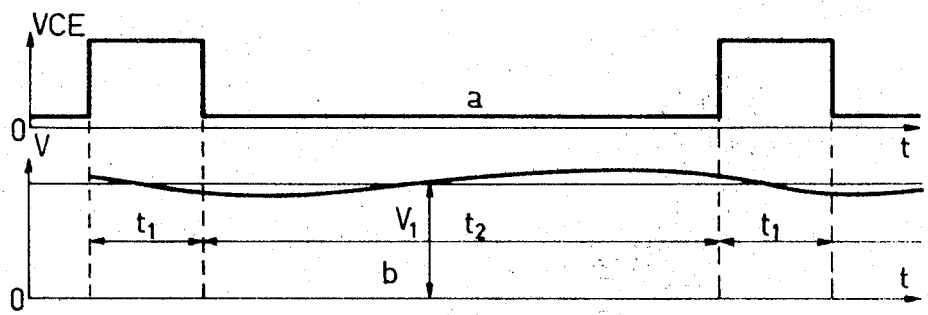
Figure 5:
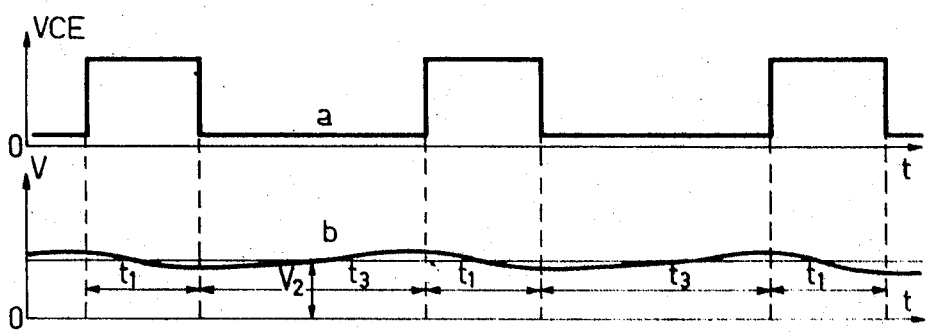

Features and advantages of the invention will appear from the following description of an embodiment thereof, given by way of example only, with reference to the accompanying drawings, in which:

FIG. 1 shows a curve representing the variation of the strength of the current through the clutch coil as a function of the engine speed, FIG. 2 is a circuit diagram of the electronic control arrangement in accordance with the invention, FIG. 3 shows curves $a$ and $b$ which respectively represent the variation of the control voltage, and the corresponding variation of the strength of the current through the clutch coil, as a function of the engine speed, FIG. 4 shows curves $a$ and $b$ which respectively represent, for a given engine speed, the output voltage of the control stage and the control voltage proper as a function of time, and FIG. 5 shows curves $a$ and $b$ which represent the voltages at the same points as the diagrams $a$ and $b$ of FIG. 4, but for a higher engine speed.

FIG. 1 shows that the current I in the clutch coil is a maximum in a narrow speed range $a$ beginning from zero speed, i.e. with stationary engine. This zone corresponds to the possibility of starting the engine in the case of starter failure.

A second zone $b$ in which the current I is very weak corresponds to the disengaged position for an idling speed range in which the engine does not drive the transmission.

A third zone $b'$ corresponds to the actuation of the choke of the carburetor. As is known, this operation has the additional effect of increasing the idling speed, which is likely to bring the current into the zone of gradual increase.

A fourth zone $c$ corresponds to the gradually increasing driving of the transmission gear with a certain amount of slipping, the current increasing in a quasi-linear manner according to a curve $k$ drawn as a solid line.

A fifth zone $c'$ corresponds to the gradually increasing driving with operating choke, the current increasing according to a curve $l$ drawn as a dashline.

A sixth zone $d$ corresponds to the locking of the clutch by the maximum current, the choke being inoperative.

A seventh zone $d'$ corresponds to the locking of the clutch by the maximum current, the choke being operative.

A curve $m$ drawn as a dashline corresponds to the level of limited current strength during gear changing.

In FIG. 2, the base of an amplifier transistor 3 of NPN type receives a signal from an output E of a transducer through a capacitor 1 connected in series with a resistor 2, a resistor 4 providing the bias and being connected through a smoothing resistor 25 to the positive terminal of a voltage source VB, the negative terminal of which is connected to ground.

The emitter of the transistor 3 is directly connected to ground, the collector being connected to the positive terminal of the source VB through a load resistor 5 and the smoothing resistor 25.

A trigger transistor 11 of NPN type has its base connected to the collector of the transistor 3 through a capacitor 7 and through a resistor 9 to the cathode of a semiconductor diode 6, the anode of which is also connected to the collector of the transistor 3. The cathode of the diode 6 is decoupled by an electrolytic capacitor 8 and is also connected to the base of a transistor 32 through a resistor 10.

The emitter of the transistor 11 is decoupled by an electrolytic capacitor 19 and connected to the base of the transistor 32 through a resistor 18 and also to ground through a temperature control network comprising NTC resistors 13 and 15 and resistors 14, 16 and 20.

The emitter of the transistor 11 is also connected to ground through a bridge comprising the series combination of resistors 27 and 28 and a temperature correction diode 29.

The above-described two stages are fed from the positive terminal of the source VB through the resistor 25, which is decoupled by smoothing capacitors 17 and 26, the voltage being maintained constant by a Zener diode 21 connected in series with a temperature correction diode 22.

The comparator transistor 32 of NPN type has its base connected to ground through a capacitor 38 and also to the collector of a transistor 47 through resistors 43 and 49, the junction point of which is decoupled to ground by an electrolytic capacitor 46.

The emitter of the transistor 32 is connected to the sliding contact of a potentiometer 24 connected at one end to ground and at the other end to the cathode of the Zener diode 21, through a resistor 23, and also to a make-and-break switch 36 arranged on the choke control of the vehicle, through a resistor 35.

The collector of the transistor 32 is connected to the positive terminal of the source VB through two resistors 33 and 34.

A transistor 37 of PNP-type forms, together with a transistor 47 also of PNP type, a monostable power circuit. The base of the transistor 37 is connected to the junction of the resistors 33 and 34 and its emitter to the positive terminal of the source VB.

The base of the transistor 37 is also connected to the collector of the transistor 47 through the series combination of a capacitor 42 and a resistor 48. The collector of the transistor 37 is connected to ground through a resistor 40 as is the base of the transistor 47, the emitter of which is connected to the positive terminal of the source VB through a bias-increasing diode 51.

The emitter and the collector of the transistor 47 are connected to one another through a resistor 53.

The collector of the transistor 47 is connected to ground, on the one hand directly through a resistor 52 and also through the series combination of resistors 44, 45 and 50. The junction of the resistors 44 and 50 is decoupled to ground by an electrolytic capacitor 41, while the junction of the resistors 44 and 45 is connected to one of the poles of an accelerator-pedal make-and-break switch 39, the other pole of which is connected to ground. The junction of the resistors 44 and 45 is also connected to the anode of a diode 31 which, in series with a diode 30, is connected to the junction of the resistors 27 and 28.

The collector of the transistor 47 is connected to one of the terminals of a clutch coil 56, the other terminal of which is connected to the common point of a gear shift lever changeover switch 57. One terminal $a$ of switch 57 is connected to ground, its other terminal $b$ being connected to the positive terminal of the source VB.

A damping circuit comprising the series combination of a diode 54 and a resistor 55 is connected in parallel with the coil 56.

The operation of the control circuit according to the invention may be explained as follows:

The sinusoidal output signal of the magnetic transducer is applied, through the capacitor 1 and the resistor 2, to the base of the high-gain amplifier in which it is shaped by clipping. The clipped signal is applied, through the capacitor 7, to the base of the transistor 11 which, together with the time constant of the resistor 9 and of the capacitor 7 forms a monostable circuit, the blocking period of which is fixed and equal to the aforesaid time constant. It should be noted that this time constant is smaller than the conducting period of the transistor 3 at the maximum frequency of the signals delivered by the magnetic transducer at the input E.

A capacitor 19, interposed between the emitter of the transistor 11 and ground, integrates the pulses supplied by this transistor.

FIGS. 4a, 4b, and 5a, 5b show the cutoff period $t_1$ of the transistor 11 corresponding to the time constant of the resistor 9 and the capacitor 7. For a period $t_1+t_2$ of the transducer (FIG. 4b) the mean voltage $V_1$ at the terminals of the capacitor 19 is greater than the voltage $V_2$ (FIG. 5b) corresponding to a shorter period $t_1+t_3$ which occurs at a higher engine speed.

Thus, it may be seen that when $t_1$ does not change, the voltage at the terminals of the capacitor 19 is inversely proportional to the engine speed and is independent of the level of the signals supplied by the transducer.

The resulting control voltage is applied to the base of the transistor 32, the emitter of which is at a reference voltage which may be adjusted by means of the potentiometer 24. This transistor controls the monostable power circuit in a manner such that, during its saturation condition, the current will correspond to the zone $b$ (FIGS. 3a and 3b). During its variable conduction condition, the current will correspond to the zone $c$, and during its cutoff condition the current will correspond to the zone $d$.

In FIG. 3a, the straight line $p$ represents the control voltage as a function of the engine speed, the dashed line $n$ corresponds to the reference voltage adjustable by the potentiometer 24 and the straight line $o$ corresponds to the cutoff threshold voltage of the transistor 32.

The part of the line $p$ situated above the reference voltage line $n$ corresponds to the saturation condition of the transistor 32 (zone $b$ of FIG. 3b). The line part situated between the reference voltage $n$ and the threshold voltage $o$ corresponds to the variable conduction condition (zone $c$ of FIG. 3b), and the part situated below the threshold voltage line corresponds to the cutoff condition (zone $d$ of FIG. 3b).

The saturation condition of the transistor 32, which corresponds to the zone $b$, drives the transistor 37 into saturation and the transistor 47 into the cutoff condition, thus determining the first stable state of the monostable power circuit, and a weak current determined by the value of the resistance 53 flows through the coil 56. In the zone $c$ the decrease of the base current of the transistor 32 brings this transistor into the conductive condition, the transistor 37 comes out of saturation and the transistor 47 begins to conduct. The duration of the conduction of the transistor 37 is determined by the feedback circuit comprising the capacitor 42 and the resistor 48, by the input impedance of the transistor 37 and by the value of the base current, which value itself depends on the collector current of the transistor 32.

Since the collector current of the transistor 32 decreases with increasing frequency of the input signal, the duration of the conductive condition of the transistor 37 decreases and the duration of that of the transistor 47 increases, and this determines the gradual increase of the means current through coil 56 due to variation of the mark/space relation of the pulses of the monostable power circuit.

In the zone $d$ the transistor 37 is cut off and the transistor 47 is driven into saturation. The monostable power circuit is then in its second stable state and a continuous current flows through the winding 56. The damping circuit comprising the diode 54 and the resistor 55 limits the surge at the terminals of the winding 56 due to the interruption of the current, so that the transistor 47 is protected against breakdown.

The described operation applies to the basic sequences, that is to say, the disengaged position (zone $b$), progressive engagement of the clutch (zone $c$) and locked clutch (zone $d$).

Several ancillary functions are provided to permit use of the arrangement in a motor vehicle.

Thus, the zone $a$ (FIG. 1) in which the clutch is locked when the engine is not running is achieved by causing the transistor 3 to conduct at engine standstill. For this purpose, the resistor 4 is connected to the positive terminal of the source VB and the diode 6 is cut off owing to the low collector voltage applied to its anode. As a result, the transistors 11, 32 and 37 are cut off and the transistor 47 continuously delivers output current to the coil 56.

When the engine starts running, the diode 6 is rendered conductive at the first pulses received from the transducer and the capacitor 8 is rapidly charged, preventing the transistor 11 from being permanently cut off again. Starting from an engine speed of a few revolutions per minute, the operation in idling condition (zone *b*) is reached and the clutch again disengaged.

In operation with the choke, the switch 36 is closed, which results in a decrease of the reference voltage (line *n* in FIG. 3a) and consequently in an increase of the extension of the horizontal part comprising the zone *b*, so that the increase of idling speed due to the operation of the choke cannot possibly give rise to an untimely locking of the clutch.

The accelerator switch 39 short circuits the resistor 45 when the accelerator is depressed, and the diodes 30 and 31 are thus cut off and the operation is normal.

On the other hand, when the switch 39 is open (foot raised) an additional control voltage supplied by the integrating circuit comprising the resistor 50 and the capacitor 41 and which is connected to the collector of the transistor 47, modifies the bias of the transistor 32 and hence prevents the monostable power circuit from reaching its second stable state, so that the current is limited to a predetermined value (curve *m* in FIG. 1). This arrangement enables the clutch to be reengaged without jerks when shifting gears from a higher to a lower speed.

When the described arrangement is used to control a magnetic-powder-type clutch, operation may be facilitated by causing a weak current to flow within the zone *b*, said current being too weak for the clutch to be engaged but providing a smoother operation. This rest current is determined by the resistor 53.

During a gear shift this small current would be sufficient to prevent a correct change from one speed to another. Therefore the gear lever is provided with a changeover switch 57, which is normally in a rest position *a* (normal operation). During a gear shift, the switch 57 moves to position *b* and the coil 56 is then traversed by a weak reverse current determined by the value of the series resistor 52, of the resistance of the diode 54 in the forward direction and of the resistor 55.

The flow of a reverse current permits a complete disengagement of the clutch by cancelling out the remanent magnetism.

The double integrating circuit comprising the resistors 43, 49 and the capacitors 38, 46 forms a feedback circuit between the output of the transistor 47 and the input of the transistor 32. This renders the operation of the monostable power circuit largely independent of the voltage variations of the source VB.

The diodes 22, 29 and the NTC resistors 13 and 15 enable the characteristics of the arrangement to be stabilized within the large temperature range wherein it has to operate.

Obviously modifications may be made in the embodiment described, particularly by substituting equivalent technical means, without departing from the scope of the present invention.

We claim:

1. An electronic arrangement for controlling the electromagnetic clutch of a motor vehicle, comprising an engine speed transducer, a control circuit controlled by a voltage supplied by said transducer, said voltage increasing as the engine speed increases, and a power circuit controlled by said control circuit for supplying energy to an operating coil of the clutch, said control circuit including means for establishing a first operating threshold level below which it supplies a control signal to the power circuit which controls the power circuit so that the latter circuit supplied maximum energy to the coil and above which it controls the said power circuit so that it supplies minimum energy to the coil, a second operating threshold level above which it controls the power circuit so that it supplies to the coil a varying amount of energy that increases with increasing engine speed, and a third operating threshold level above which it controls the power circuit so that it supplies maximum energy to the coil.

2. An arrangement as claimed in claim 1, in which said speed transducer delivers a signal having a repetition frequency that is proportional to the engine speed, said control circuit comprising a first stage having a transistor connected as a clipping circuit and a second stage having at least one transistor connected to form a monostable trigger circuit having a time constant that is smaller than the minimum time duration of a pulse delivered by said speed transducer and having said first threshold.

3. An arrangement as claimed in claim 2, characterized in that the output electrode of said first stage is connected to a biasing circuit for the input electrode of said second stage through a diode of which the electrode opposite to said output electrode is connected to a capacitor at the terminals of which the clipped pulses delivered by the first stage produce a voltage tending to render conducting said transistor of the second stage.

4. An arrangement as claimed in claim 2 wherein the output electrode of said second stage is connected to the input electrode of a transistor of a third stage through a first integrating network, said third stage being connected as a comparator and providing said second threshold.

5. An arrangement as claimed in claim 4, characterized in that said third stage has a saturation threshold level which constitutes said third threshold level.

6. An arrangement as claimed in claim 4 including means connecting the output electrode of said comparator stage to the input terminal of said power circuit, said power circuit comprising two transistors connected as a monostable trigger circuit having an output terminal connected to said operating coil.

7. An arrangement as claimed in claim 6, characterized by a second integrating, stabilizing network arranged between the output terminal of said power circuit and the input electrode of the transistor of said comparator stage.

8. An arrangement as claimed in claim 4 further comprising a make-and-break switch coupled to the engine choke control and connected to modify the operating characteristics of said comparator stage.

9. An arrangement as claimed in claim 4 further comprising a make-and-break switch coupled to the engine accelerator pedal and connected to modify the bias of the transistor of said comparator stage.

10. An arrangement as claimed in claim 4 further comprising a changeover switch coupled to the gear lever of the engine gearbox and connected to cause a weak reverse current to flow through said operating coil when said gear lever is operated.